United States Patent
Chen et al.

(10) Patent No.: US 9,884,452 B2
(45) Date of Patent: Feb. 6, 2018

(54) SUBSTRATE-BONDING DEVICE AND METHOD OF THE SAME

(71) Applicant: Quanta Computer Inc., Taoyuan (TW)

(72) Inventors: Ching-Chih Chen, New Taipei (TW); Lin-Huei Wang, Taichung (TW); Lai-Peng Lai, Taoyuan (TW); Ying-Cheng Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 15/094,202

(22) Filed: Apr. 8, 2016

(65) Prior Publication Data

US 2017/0210062 A1   Jul. 27, 2017

(30) Foreign Application Priority Data

Jan. 27, 2016  (CN) .......................... 2016 1 0054468

(51) Int. Cl.
| | | |
|---|---|---|
| *B32B 41/00* | (2006.01) | |
| *B29C 65/56* | (2006.01) | |
| *B29C 63/00* | (2006.01) | |
| *B29C 63/02* | (2006.01) | |
| *B29K 709/08* | (2006.01) | |
| *B29L 31/34* | (2006.01) | |

(52) U.S. Cl.
CPC .......... *B29C 65/56* (2013.01); *B29C 63/0052* (2013.01); *B29C 63/0073* (2013.01); *B29C 63/02* (2013.01); *B29C 63/024* (2013.01); *B29K 2709/08* (2013.01); *B29K 2995/0026* (2013.01); *B29L 2031/3475* (2013.01)

(58) Field of Classification Search
CPC ...................................................... B29C 65/56
USPC ............................. 156/60, 64, 350, 378, 379
See application file for complete search history.

(56) References Cited

U.S. PATENT DOCUMENTS

| | | | | |
|---|---|---|---|---|
| 2006/0142412 A1* | 6/2006 | Yamaoka | .................. | B32B 7/12 523/111 |
| 2009/0038734 A1* | 2/2009 | Matsuhira | ............ | G01N 21/958 156/64 |
| 2012/0020056 A1* | 1/2012 | Yamagata | ......... | G02F 1/133308 362/97.1 |

FOREIGN PATENT DOCUMENTS

| | | |
|---|---|---|
| CN | 105224115 A | 1/2016 |
| TW | M313932 U | 6/2007 |
| TW | 2010-17499 A | 5/2010 |
| TW | 2015-43286 A | 11/2015 |

* cited by examiner

*Primary Examiner* — Michael N Orlando
*Assistant Examiner* — Joshel Rivera
(74) *Attorney, Agent, or Firm* — Rabin & Berdo, P.C.

(57) ABSTRACT

A method of bonding substrates includes steps as follows. Providing a curved glass substrate and a flexible light-transmissive film; moving a roller to press the flexible light-transmissive film onto the curved glass substrate so that the flexible light-transmissive film matches a curvature of the curved glass substrate to gradually fit and bond onto the curved glass substrate; sensing the attaching level of at least one local area of the flexible light-transmissive film bonded on the curved glass substrate; and adjusting a press force exerted by the roller to the local area of the flexible light-transmissive film according to the attaching level during the flexible light-transmissive film is bonded onto the curved glass substrate.

5 Claims, 9 Drawing Sheets

SUBSTRATE-BONDING DEVICE AND METHOD OF THE SAME

RELATED APPLICATIONS

This application claims priority to China Application Serial Number 201610054468.8, filed Jan. 27, 2016, which is herein incorporated by reference.

BACKGROUND

Field of Disclosure

The present disclosure relates to a bonding device and a method of the same. More particularly, the present disclosure relates to a substrate-bonding device and a method of bonding substrates.

Description of Related Art

With the advance and development of electronic technology, a touch panel is generally attached onto a display panel of an electronic device, such that users can conveniently and user-friendly operate the touch panel based on displaying content on the display panel. The electronic device is normally referred to as a mobile phone, a GPS navigator system, a tablet PC, a Personal Digital Assistant (PDA) or a laptop PC.

A current flat surface display screen is further evolving as a curved surface display screen to meet specific displaying requirements. However, since a curved glass (e.g., 3D or 2.5D curved glass) of the curved surface display screens has a curvature, when bonding the touch panel onto the curved glass, the touch panel and the curved glass sometimes may be not perfectly bonded to each other so as to affect the display screen performance and the touch control sensitivity of the curved surface display screens.

Therefore, providing a solution to effectively solve the aforementioned inconvenience and shortages and to increase the competitiveness of industries is seriously concerned.

SUMMARY

An aspect of the disclosure is to provide a substrate-bonding device and a method of bonding substrates to overcome the defects and inconvenience of the prior art.

According to one embodiment, the method of bonding substrates includes steps as follows. A curved glass substrate and a flexible light-transmissive film are provided; a roller is moved to press the flexible light-transmissive film onto the curved glass substrate so that the flexible light-transmissive film matches a curvature of the curved glass substrate to gradually fit and bond onto the curved glass substrate; the attaching level of at least one local area of the flexible light-transmissive film bonded on the curved glass substrate is sensed; and a press force exerted by the roller to the local area of the flexible light-transmissive film is adjusted according to the attaching level during the flexible light-transmissive film is bonded onto the curved glass substrate for optimizing the attaching level of the local area of the flexible light-transmissive film bonded on the curved glass substrate.

In one or more embodiments of the present disclosure, in the step of the curved glass substrate and the flexible light-transmissive film being provided, the embodiment further includes steps as follows. The curved glass substrate is tightly sucked on a first curved surface of an upper loading plate with a vacuum suction module in which a curvature of the curved surface is same as the curvature of the curved glass substrate; and the flexible light-transmissive film is tightly sucked on a lower loading plate with a second vacuum suction module.

In one or more embodiments of the present disclosure, in the step of the attaching level of the local area of the flexible light-transmissive film bonded on the curved glass substrate being sensed, the embodiment further includes a step of a shortest distance is measured between the local area of the flexible light-transmissive film and the curved glass substrate; or a pressure value that the curved glass substrate responding to the local area of the flexible light-transmissive film is detected.

In one or more embodiments of the present disclosure, the method of bonding substrates further includes steps as follows. At least one of the curved glass substrate and the flexible light-transmissive film is moved so that the flexible light-transmissive film is able to be partially contacted to the curved glass substrate before the roller is moved to press the flexible light-transmissive film onto the curved glass substrate; and when the roller is moved to press the flexible light-transmissive film onto the curved glass substrate, the curved glass substrate is rotated to press the flexible light-transmissive film from one side of the flexible light-transmissive film to the other side of the flexible light-transmissive film in order so that the flexible light-transmissive film fits and bonds onto a curved-surface screen of the curved glass substrate.

According to one embodiment, the substrate-bonding device includes an upper loading plate, a flexible mesh layer, a lower loading plate, a roller, a sensing unit, a transmission device and a controller unit. The upper loading plate has a curved surface for holding a curved glass substrate thereon. The flexible mesh layer holds a flexible light-transmissive film thereon. The lower loading plate is arranged under the upper loading plate, for loading the flexible mesh layer thereon and fixing the flexible light-transmissive film through the flexible mesh layer. The roller is movably arranged at one surface of the flexible mesh layer being opposite to the upper loading plate, for moving to press the surface of the flexible mesh layer opposite to the upper loading plate so that the flexible light-transmissive film matches a curvature of the curved glass substrate to gradually fit and bond onto the curved glass substrate. The sensing unit senses the attaching level of at least one local area of the flexible light-transmissive film bonded on the curved glass substrate. The transmission device is connected to the roller for rising and lowering the roller. The controller unit is electrically connected to the transmission device and the sensing unit for controlling the transmission device to adjust the rising and lowering in vertical movement of the roller for correspondingly adjusting a press force exerted by the roller to the local area of the flexible light-transmissive film in accordance with the attaching level thereof during the flexible light-transmissive film is bonded onto the curved glass substrate for optimizing the attaching level of the local area of the flexible light-transmissive film bonded on the curved glass substrate.

Therefore, in the aforementioned embodiments, the substrate-bonding device and the method of the same allow the flexible light-transmissive film to fit and bond onto the curved glass substrate perfectly thereby providing the best bonding effectiveness between the flexible light-transmissive film and the curved glass substrate, and further decreasing the possibilities of degrading the curved-surface screen quality and the touch control sensitivity of the curved glass substrate.

In one or more embodiments of the present disclosure, the substrate-bonding device further includes a first vacuum suction module and a second vacuum suction module. The first vacuum suction module is connected to the upper loading plate. The curved surface is formed with a plurality of first holes, and the first vacuum suction module is used for tightly sucking the curved glass substrate on the curved surface through the first holes. The second vacuum suction module is connected to the lower loading plate. The lower loading plate is formed with a plurality of second holes, the flexible mesh layer is formed with a plurality of mesh holes, and the second vacuum suction module tightly sucks the flexible light-transmissive film on the flexible mesh layer through the mesh holes and the second holes.

In one or more embodiments of the present disclosure, the sensing unit is disposed on the roller for synchronously moving along with the roller.

In one or more embodiments of the present disclosure, the upper loading plate is formed with a recess, wherein the curved surface is a concave curved surface formed in the recess and facing towards the lower loading plate, and a curvature of the concave curved surface is same as the curvature of the curved glass substrate.

In one or more embodiments of the present disclosure, the upper loading plate includes a carrier board, a curved surface platform and a rotating motor. The carrier board is formed with a depression thereon. An opening of the depression faces towards the lower loading plate. The curved surface platform is rotatably disposed in the depression. The curved surface is a convex curved surface of the curved surface platform facing towards the lower loading plate, and a curvature of the convex curved surface is same as the curvature of the curved glass substrate. The rotating motor is electrically connected to the controller unit, and rotatably connected to the curved surface platform, and arranged between two opposite sides of the curved surface platform, used for rotating the curved surface platform. The controller unit controls the rotating motor and the transmission device, so that the curved glass substrate and the flexible light-transmissive film are mutually sandwiched between the convex curved surface of the curved surface platform and the roller.

In one or more embodiments of the present disclosure, the curved surface platform is further provided with at least one fixing pin, and the carrier board is further formed with at least one receiving hole, wherein the fixing pin is telescopically extends into the receiving hole for fixing the curved surface platform.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
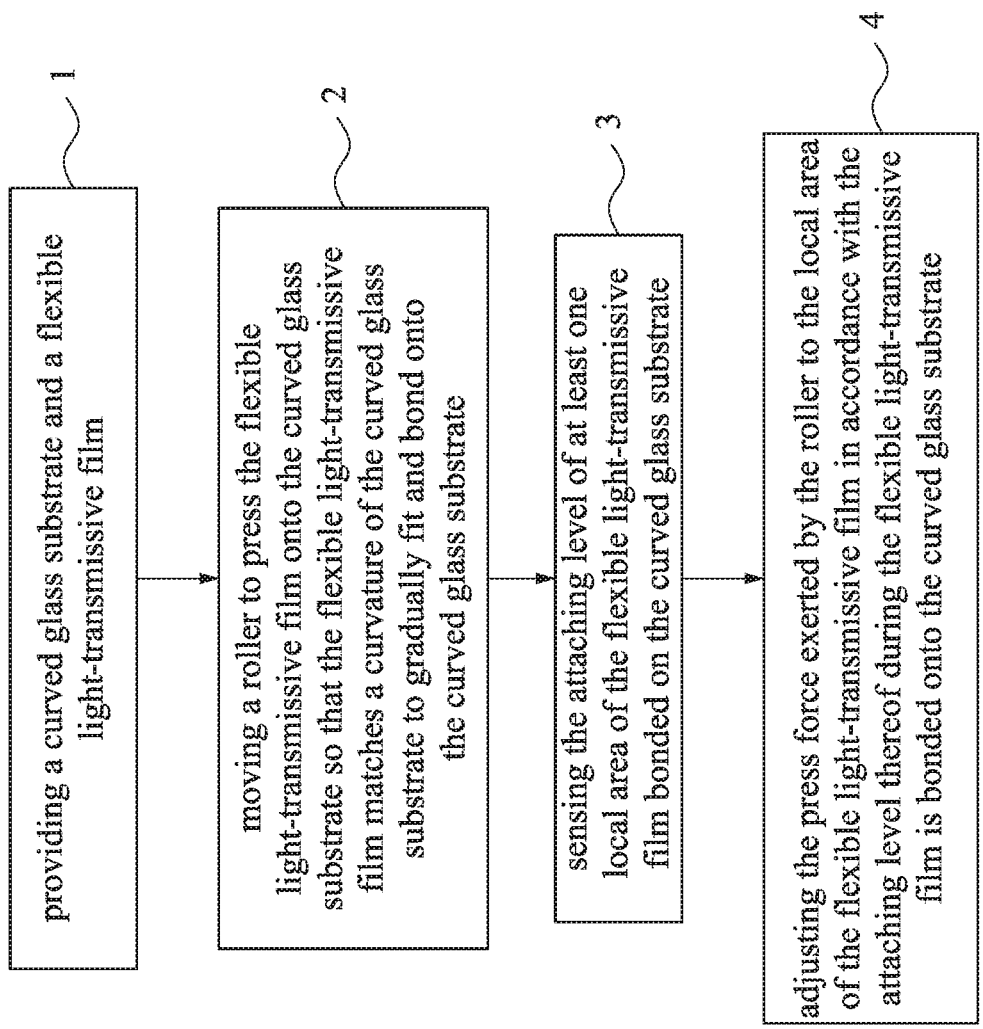
FIG. 1 is a flow chart of a method of bonding substrates according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

The disclosure is to provide a substrate-bonding device and a method of bonding substrates, which is suitable to a bonding process of the flexible light-transmissive film and the curved glass substrate. In the bonding process, the attaching level (e.g., shortest linear distance, pressure value, or another sensing condition) of at least one local area of the flexible light-transmissive film bonded on the curved glass substrate can be instantly sensed, then, a press force for pressing the local area of the flexible light-transmissive film is adjusted correspondingly in accordance with the attaching level thereof so that the flexible light-transmissive film can be fit and bonded onto the curved glass substrate perfectly, thereby providing the best bonding effectiveness between the flexible light-transmissive film and the curved glass substrate, and further decreasing the possibilities of degrading the curved-surface screen quality and the touch control sensitivity of the curved glass substrate.

FIG. 1 is a flow chart of a method of bonding substrates according to one embodiment of the disclosure. As shown in FIG. 1, the method of bonding substrates includes step 1 to step 4 outlined as follows. In step 1, providing a curved glass substrate and a flexible light-transmissive film. For example, the step further includes steps of respectively tightly sucking the curved glass substrate and the flexible light-transmissive film on two separated loading plates which are separately facing to each other with different vacuum suction modules, however, the disclosure is not limited to another holding method.

In step 2, moving a roller to press the flexible light-transmissive film onto the curved glass substrate so that the flexible light-transmissive film matches a curvature of the curved glass substrate to fit and bond onto the curved glass substrate gradually.

In step 3, sensing the attaching level of at least one local area of the flexible light-transmissive film bonded on the curved glass substrate. For one example, the step further includes a step of measuring a gap distance (i.e., shortest linear distance) defined between the local area of the flexible light-transmissive film and the curved glass substrate. For another example, the step further includes a step of measuring a bonding force (i.e., pressure value) of the local area of the flexible light-transmissive film bonding on the curved glass substrate, however, the disclosure is not limited to another sensing method.

In step 4, in the bonding process, adjusting a press force exerted by the roller to the local area of the flexible light-transmissive film in accordance with the attaching level thereof during the flexible light-transmissive film is bonded onto the curved glass substrate for optimizing the attaching level of the local area of the flexible light-transmissive film bonded on the curved glass substrate. For example, the step further includes a step of vertically rising and lowering the roller to adjust the press force exerted by the roller to the local area of the flexible light-transmissive film.

Briefly, although attaching forces of the roller horizontally moving to press the overall flexible light-transmissive film are substantially the same, however, those attaching forces still cannot ensure that the flexible light-transmissive film can fit and bond onto the curved glass substrate perfectly, for example, an equal-width gap can not be always maintained between the flexible light-transmissive film and the curved glass substrate. Thus, by using the roller to vertically press the local area of the flexible light-transmissive film with a single-spot contact, or to remove away from the flexible light-transmissive film, the attaching level of the local area of the flexible light-transmissive film bonded on the curved glass substrate can be adjusted correspondingly.

Therefore, the method of bonding substrates of the aforementioned embodiment allows the flexible light-transmissive film to fit and bond onto the curved glass substrate perfectly, thereby providing the best bonding effectiveness between the flexible light-transmissive film and the curved glass substrate, and further decreasing the possibilities of degrading the curved-surface screen quality and the touch control sensitivity of the curved glass substrate.

Furthermore, before the roller presses the flexible light-transmissive film, the embodiment of the method of bonding substrates further includes steps of moving at least one of the curved glass substrate and the flexible light-transmissive film so that the flexible light-transmissive film is able to be partially contacted to the curved glass substrate. For one example, the embodiment of the method of bonding substrates only moves (vertically lowers) the curved glass substrate, or only moves (vertically rise) the flexible light-transmissive film, or both moves (vertically lowers) the curved glass substrate and moves (vertically rises) the flexible light-transmissive film so that the curved glass substrate and the flexible light-transmissive film can be bonded together eventually. For another example, the embodiment of the method of bonding substrates repeatedly rotates the curved glass substrate so that the curved glass substrate presses the flexible light-transmissive film from one side of the flexible light-transmissive film to the other side of the flexible light-transmissive film in order.

Figure 2:
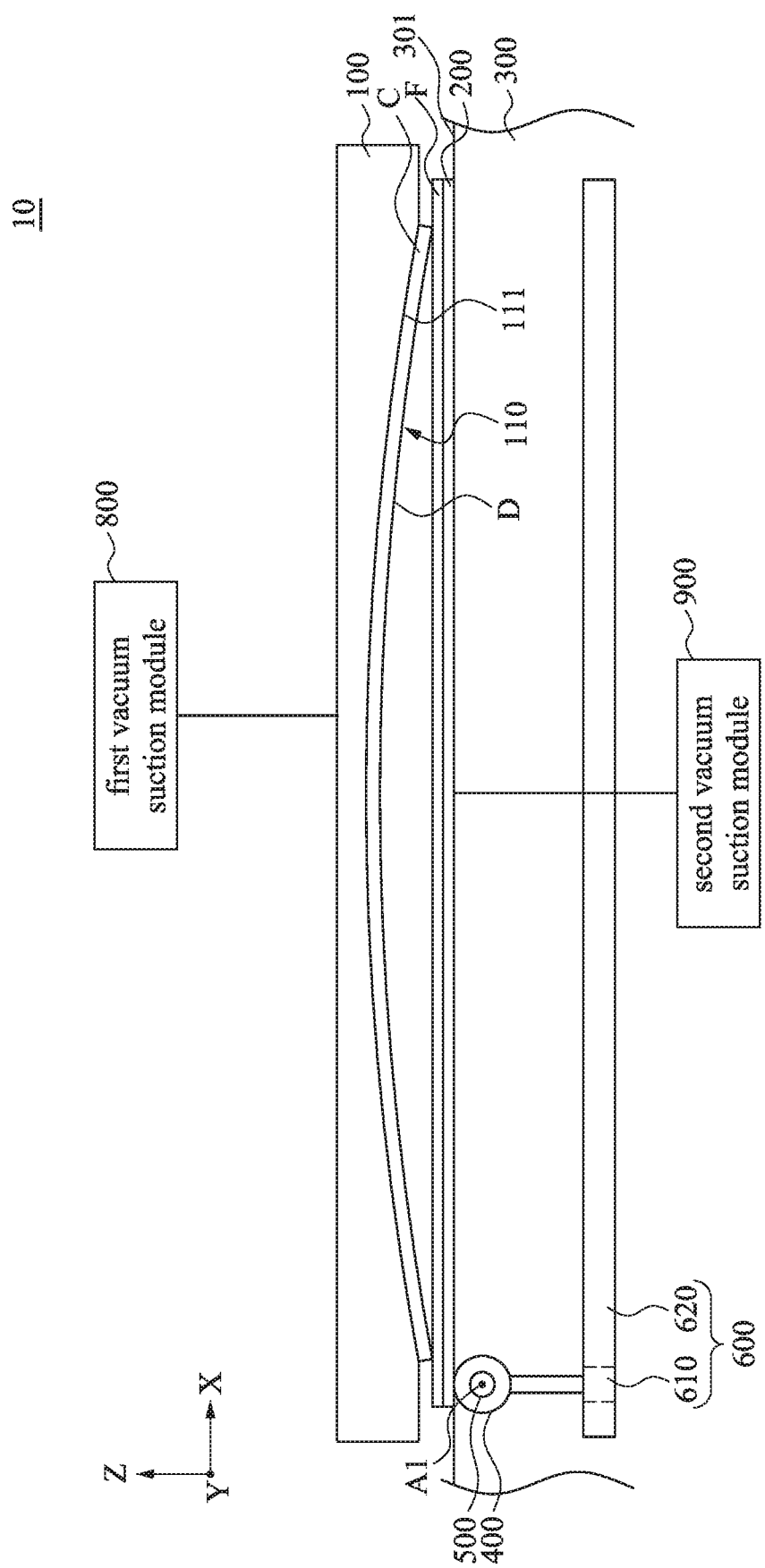
FIG. 2 is a schematic view of a substrate-bonding device according to one embodiment of the disclosure.
Figure 3:
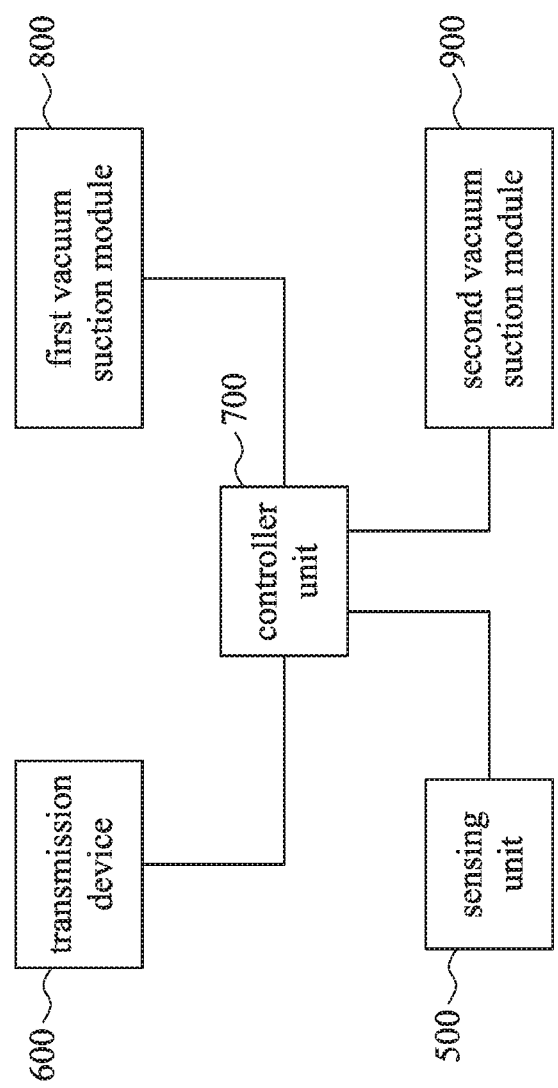
FIG. 3 is a block diagram of the substrate-bonding device of FIG. 2.
Figure 4:
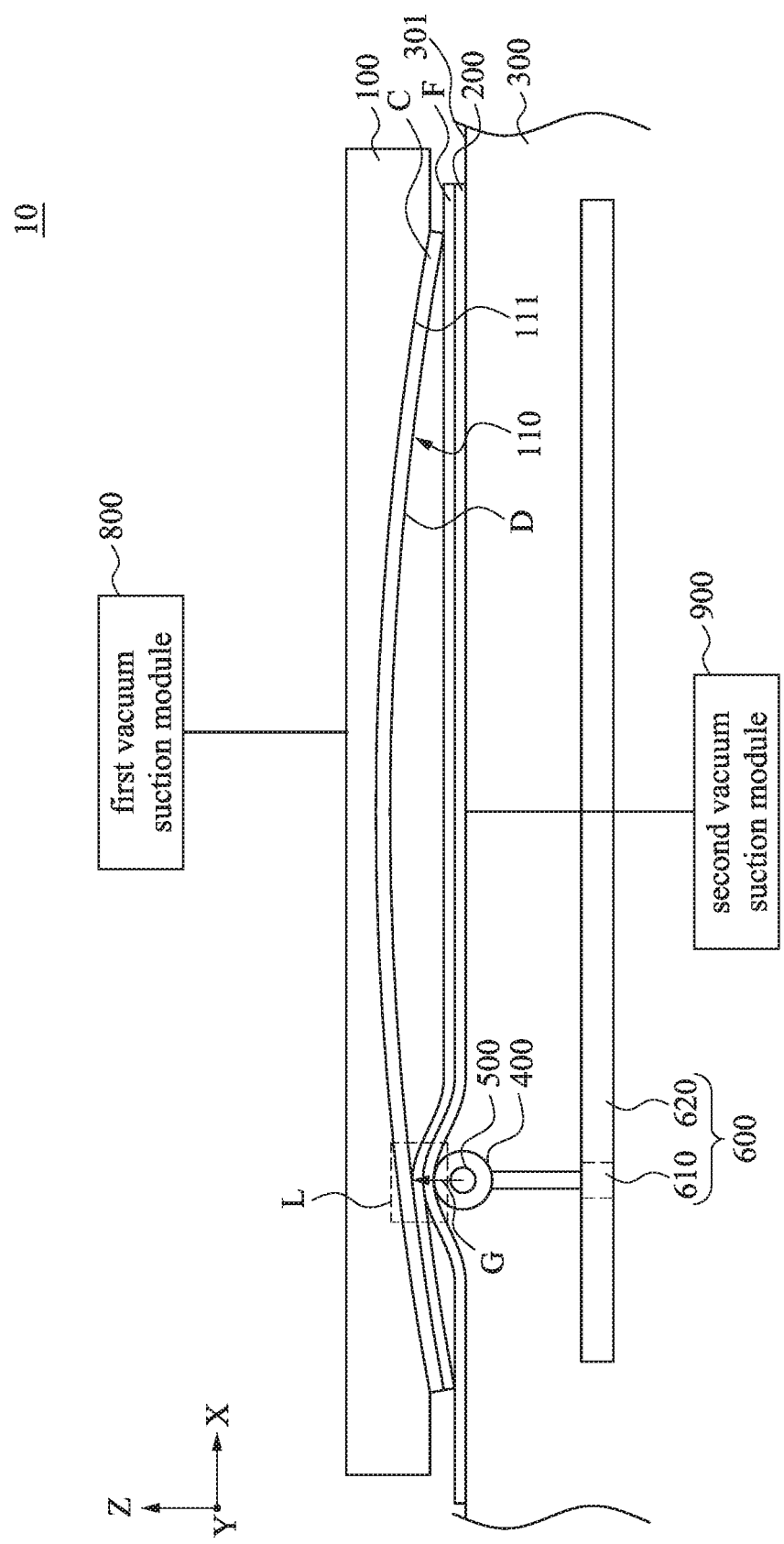
FIG. 4 is an operation schematic view of the substrate-bonding device of FIG. 2.

The reference is now made to FIG. 2 to FIG. 4 in which FIG. 2 is a schematic view of a substrate-bonding device 10 according to one embodiment of the disclosure, FIG. 3 is a block diagram of the substrate-bonding device 10 of FIG. 2, and FIG. 4 is an operation schematic view of the substrate-bonding device 10 of FIG. 2. As shown in FIG. 2 and FIG. 3, the substrate-bonding device 10 includes an upper loading plate 100, a flexible mesh layer 200, a lower loading plate 300, a roller 400, a sensing unit 500, a transmission device 600 and a controller unit 700. The upper loading plate 100 and the lower loading plate 300 separately align to each other, and the lower loading plate 300 is arranged under the upper loading plate 100. The upper loading plate 100 is provided with a curved surface thereof, and a curved glass substrate C is loaded and held on the curved surface of the upper loading plate 100. The flexible mesh layer 200 can be loaded on a top surface 301 of the lower loading plate 300 facing towards the upper loading plate 100. The flexible mesh layer 200 removably loads and holds a flexible light-transmissive film F thereon, and the lower loading plate 300 is able to fix the flexible light-transmissive film F through the flexible mesh layer 200. The transmission device 600 is connected to the roller 400, and the transmission device 600 is able to move the roller 400 three-dimensionally so that the roller 400 is movably arranged at one surface of the flexible mesh layer 200 being opposite to the upper loading plate 100, that is, the roller 400 can vertically move (i.e., rise or lower) and horizontally move at the surface of the flexible mesh layer 200 being opposite to the upper loading plate 100. As carried by the transmission device 600, the roller 400 can be moved to roll and press the surface of the flexible mesh layer 200 opposite to the curved glass substrate C so that the roller 400 matches a curvature of the curved glass substrate C and indirectly presses the flexible light-transmissive film F to fit and bond onto the curved glass substrate C gradually (FIG. 4). In this bonding step, the sensing unit 500 is able to sense the attaching level (e.g., a shortest distance defined between the flexible light-transmissive film F and the curved glass substrate C, or a pressure value that the curved glass substrate C responding to the local area of the flexible light-transmissive film F, or another sensing condition) of one local area L of the flexible light-transmissive film F bonded on the curved glass substrate C, and the local area L of the flexible light-transmissive film F is aligned vertically by the roller 400 in the Z-axis. The controller unit 700 (FIG. 3) is electrically connected to the transmission device 600 and the sensing unit 500.

The controller unit 700 (FIG. 3) is able to control the transmission device 600 to rise the roller 400 to press against the flexible mesh layer 200, to horizontally move the roller 400 to roll and press the flexible light-transmissive film F, and to press the local area (see reference L) of the flexible mesh layer 200 in a single-point style. Particularly, the controller unit 700 is able to adjust the vertical movement of the roller 400 for dynamically adjusting a press force exerted by the roller 400 to the local area (see reference L) of the flexible mesh layer 200 in accordance with the attaching level thereof during the flexible light-transmissive film F is bonded onto the curved glass substrate C for optimizing the attaching level of the local area of the flexible light-transmissive film F bonded on the curved glass substrate C.

In one specific embodiment, the lower loading plate 300 is vertically movable in the Z-axis; the vertical movement of the roller 400 does not need to be adjusted by the transmission device 600.

Figure 5:
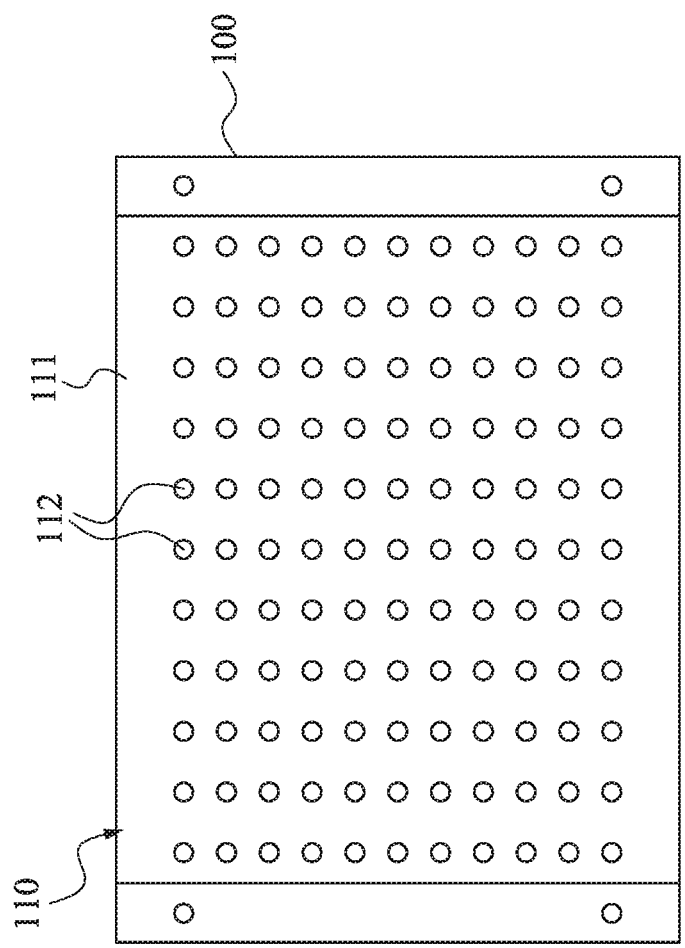
FIG. 5 is a top view of the upper loading plate of FIG. 2.

In the embodiment, for example, FIG. 5 is a top view of the upper loading plate 100 of FIG. 2. As shown in FIG. 2 and FIG. 5, the upper loading plate 100 is formed with a recess 110. The recess 110 is formed on one surface of the upper loading plate 100 facing towards the lower loading plate 300. The recess 110 is provided with a curved surface therein, and the curved surface is a concave curved surface 111 formed in the recess 110 and facing towards the lower loading plate 300. A curvature of the concave curved surface 111 is same as the curvature of the curved glass substrate C. Thus, the curved glass substrate C can be properly attached on the concave curved surface 111.

Figure 7:
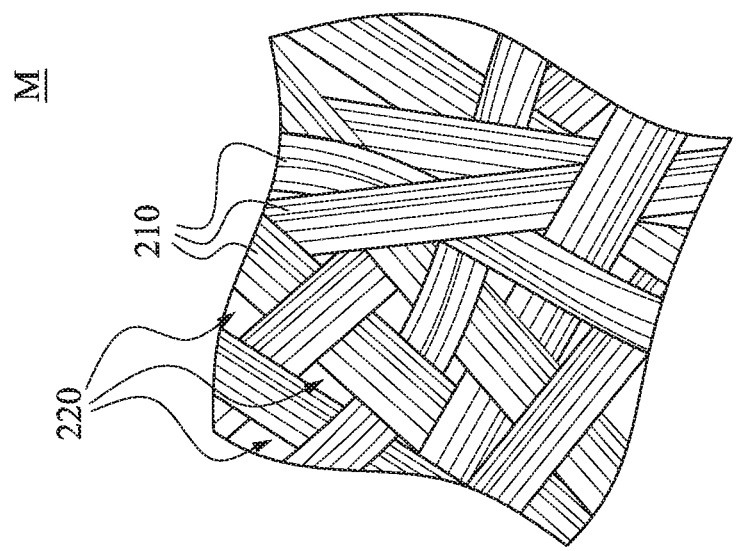
FIG. 7 is a partially enlarged view of an area M shown in FIG. 6.
Figure 6:
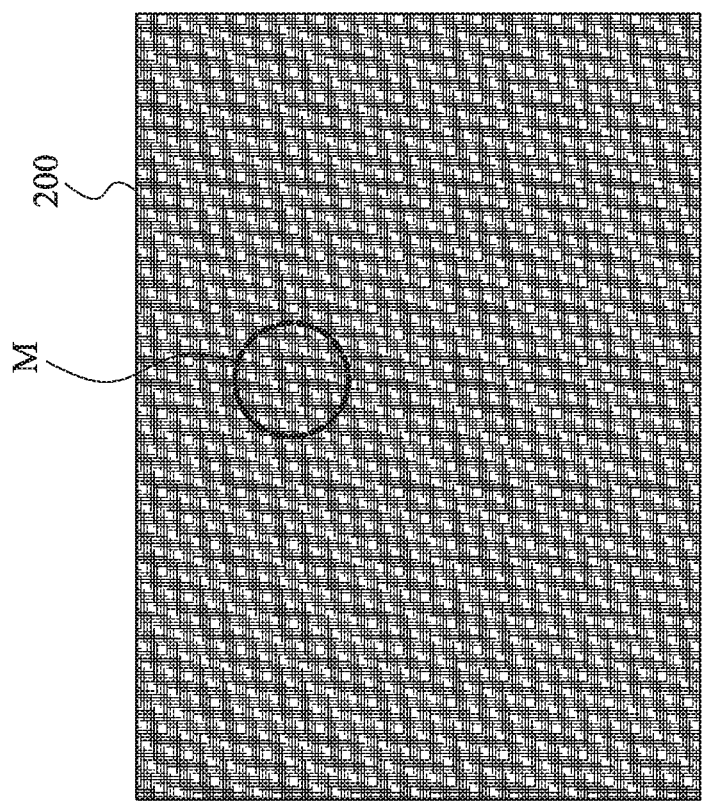
FIG. 6 is a top view of the flexible mesh layer of FIG. 2.

Also, FIG. 6 is a top view of the flexible mesh layer 200 of FIG. 2, and FIG. 7 is a partially enlarged view of an area M shown in FIG. 6. As shown in FIG. 6 and FIG. 7, the flexible mesh layer 200 is a fabric product woven by a plurality of high tensile fibers 210 (e.g., nylon, etc.). Thus, a plurality of mesh holes 220 are formed between the high tensile fibers 210 of the flexible mesh layer 200, and the flexible mesh layer 200 can match a curvature of the curved glass substrate C to be bended along with the flexible light-transmissive film F.

Refer to FIG. 2, in the embodiment, the substrate-bonding device 10 further includes a first vacuum suction module 800 and a second vacuum suction module 900. The first vacuum suction module 800 is connected to the upper loading plate 100. The concave curved surface 111 is formed with a plurality of first holes 112. Thus, The first vacuum suction module 800 is able to tightly suck the curved glass substrate C on the concave curved surface 111 with a vacuum suction way through the first holes 112 (FIG. 5). The second vacuum suction module 900 is connected to the lower loading plate 300. The top surface 301 of the lower loading plate 300 is formed with a plurality of second holes (not shown in Figures, similar to the first holes 112 shown in FIG. 5). The second vacuum suction module 900 is able to tightly suck the flexible light-transmissive film F on the flexible mesh layer 200 with a vacuum suction way through the second holes and mesh holes 220 (FIG. 7) of the flexible mesh layer 200. The controller unit 700 is electrically connected to the first vacuum suction module 800 and the second vacuum suction module 900. The controller unit 700 is able to activate the first vacuum suction module 800 and the second vacuum suction module 900 duly for tight sucking the curved glass substrate C and the flexible light-transmissive film F with vacuum suction ways.

More specifically, the transmission device 600 is able to lift the roller 400 in the Z-axis so that the roller 400 vertically presses the local area L of the flexible light-transmissive film F; or to vertically lower the roller 400 in the Z-axis so that the roller 400 leaves the flexible light-transmissive film F for lightening the press on the flexible light-transmissive film F. The transmission device 600 also can horizontally move along the plane X-Y so as to move the roller 400 to roll and press the flexible light-transmissive film F. The transmission device 600 can be a combination set including a servomotor 610 and a guide rail 620. For example, the transmission device 600 is also connected to the lower loading plate 300 so that the lower loading plate 300 also can be controlled to rise or lower by the transmission device 600.

The sensing unit 500 is disposed on the roller 400. For example, the sensing unit 500 is arranged at the axial center A1 of the roller 400 so that the sensing unit 500 can be synchronously moved along with the roller 400 so as to further synchronously sense the attaching level of the local area L of the flexible light-transmissive film F bonded on the curved glass substrate C and aligned vertically by the roller 400 in the Z-axis. However, the disclosure is not limited thereto, in another embodiment, the sensing unit also can be arranged on a cylindrical surface of the roller, or other position which allows the sensing unit to be synchronously moved along with the roller.

Furthermore, in this embodiment, one practical expression to sense the attaching level of the flexible light-transmissive film F bonded on the curved glass substrate C is to measure a gap distance (i.e., shortest linear distance) defined between the local area L of the flexible light-transmissive film F and the curved glass substrate C.

As shown in FIG. 4, the sensing unit 500 for example can be an optical sensing unit. After a sensing light G of the sensing unit 500 goes through the mesh holes 220 of the flexible mesh layer 200 (FIG. 7) and the flexible light-transmissive film F, gap distance (i.e., shortest linear distance) defined between the local area L of the flexible light-transmissive film F and the curved glass substrate C can be measured by calculating the reciprocation of the sensing light G of the sensing unit 500. It is noted that although the local area L of the flexible light-transmissive film F in FIG. 4 physically contacts the curved glass substrate C, the optical sensing unit still can microscopically detect a slight gap existing between the flexible light-transmissive film F and the curved glass substrate C.

Otherwise, the sensing unit 500 for example can be an ultrasonic sensing unit. After a sensing sonic wave of the ultrasonic sensing unit goes through the mesh holes 220 of the flexible mesh layer 200 (FIG. 7) and the flexible light-transmissive film F, gap distance (i.e., shortest linear distance) defined between the local area L of the flexible light-transmissive film F and the curved glass substrate C can be measured by calculating the reciprocation of the sensing sonic wave of the ultrasonic sensing unit.

However, the disclosure is not limited thereto. In another embodiment, the sensing unit dose not has to be synchronously moved along with the roller. For example, by using a camera to capture videos of the local area of the flexible light-transmissive film and the curved glass substrate, the gap distance (i.e., shortest linear distance) defined between the local area of the flexible light-transmissive film and the curved glass substrate can be measured by analyzing the captured videos.

In one variation of the embodiment, after the roller 400 is lifted to press the flexible mesh layer 200, the controller unit 700 further controls the transmission device 600 to keep lifting the roller 400 upwardly for enhancing the press force exerted by the roller 400 to the local area L of the flexible light-transmissive film F in accordance with the attaching level thereof in which the aforementioned gap distance (i.e., shortest linear distance) is the height that the roller 400 is lifted so that zero gap defined between the local area of the flexible light-transmissive film and the curved glass substrate can be completely achieved as possible.

In another variation of the embodiment, after the roller 400 is lifted to press the flexible mesh layer 200, other than directly keep lifting the roller 400 upwardly, the controller unit 700 determines whether the shortest distance defined between the local area of the flexible light-transmissive film and the curved glass substrate conforms a predetermined threshold, for example, matching the shortest distance with the predetermined threshold stored in a lookup table.

When the controller unit 700 determines that the aforementioned shortest distance conforms the predetermined threshold, the controller unit 700 does not adjust the press force exerted by the roller to the flexible light-transmissive film F. On the other hand, when the controller unit 700 determines that the aforementioned shortest distance does not conform the predetermined threshold, the controller unit 700 controls the roller 400 to rise or lower for correspondingly increasing or decreasing the press force exerted by the roller to the local area L of the flexible light-transmissive film F based on the differences between the aforementioned shortest distance and the predetermined threshold.

It is noticed, if the aforementioned gap distance (i.e., shortest linear distance) defined between the local area of the flexible light-transmissive film F and the curved glass substrate C is less than the predetermined threshold, it presents that the roller 400 might excessively press the flexible light-transmissive film F, thus, the controller unit 700 lowers the roller 400 for decreasing the press force exerted by the roller to the local area L of the flexible light-transmissive film F, thereby avoiding the flexible light-transmissive film F being excessively bonded on the curved glass substrate C so as to prevent from damages on the flexible light-transmissive film F or the curved glass substrate C.

In another embodiment of the disclosure, another practical expression to sense the attaching level of the flexible light-transmissive film F bonded on the curved glass substrate is to detect a pressure value that the curved glass substrate C responding to the local area of the flexible light-transmissive film F after the roller presses the flexible light-transmissive film F. The sensing unit 500 for example can be a pressure sensing unit. After the pressure value that the curved glass substrate C responding to the local area of the flexible light-transmissive film F is detected by the pressure sensing unit, the controller unit 700 determines whether the aforementioned pressure value conforms a predetermined threshold, for example, matching the aforementioned pressure value with the predetermined threshold stored in a lookup table. When the controller unit 700 determines that the aforementioned pressure value conforms the predetermined threshold, the controller unit 700 does not adjust the press force exerted by the roller 400 to the local area L of the flexible light-transmissive film F.

On the other hand, when the controller unit 700 determines that the aforementioned pressure value does not conform the predetermined threshold, the controller unit 700 controls the roller 400 to rise or lower for correspondingly increasing or decreasing the press force exerted by the roller to the local area L of the flexible light-transmissive film F based on the differences between the aforementioned pressure value and the predetermined threshold.

In one another embodiment, when the roller 400 only needs to partially press a particular location of the flexible light-transmissive film F, before the attaching level of the local area L of the flexible light-transmissive film F bonded on the curved glass substrate C is sensed, another sensing unit 500 of the substrate-bonding device 10 first senses the horizontal position of the roller 400 in the plane X-Y, next, the controller unit 700 finds out an rising distance corresponding to the horizontal position of the roller 400 in another lookup table. Finally, the controller unit 700 controls the transmission device 600 to keep lifting the roller 400 upwardly in which the rising distance is the height that the roller 400 is lifted.

Figure 8A:
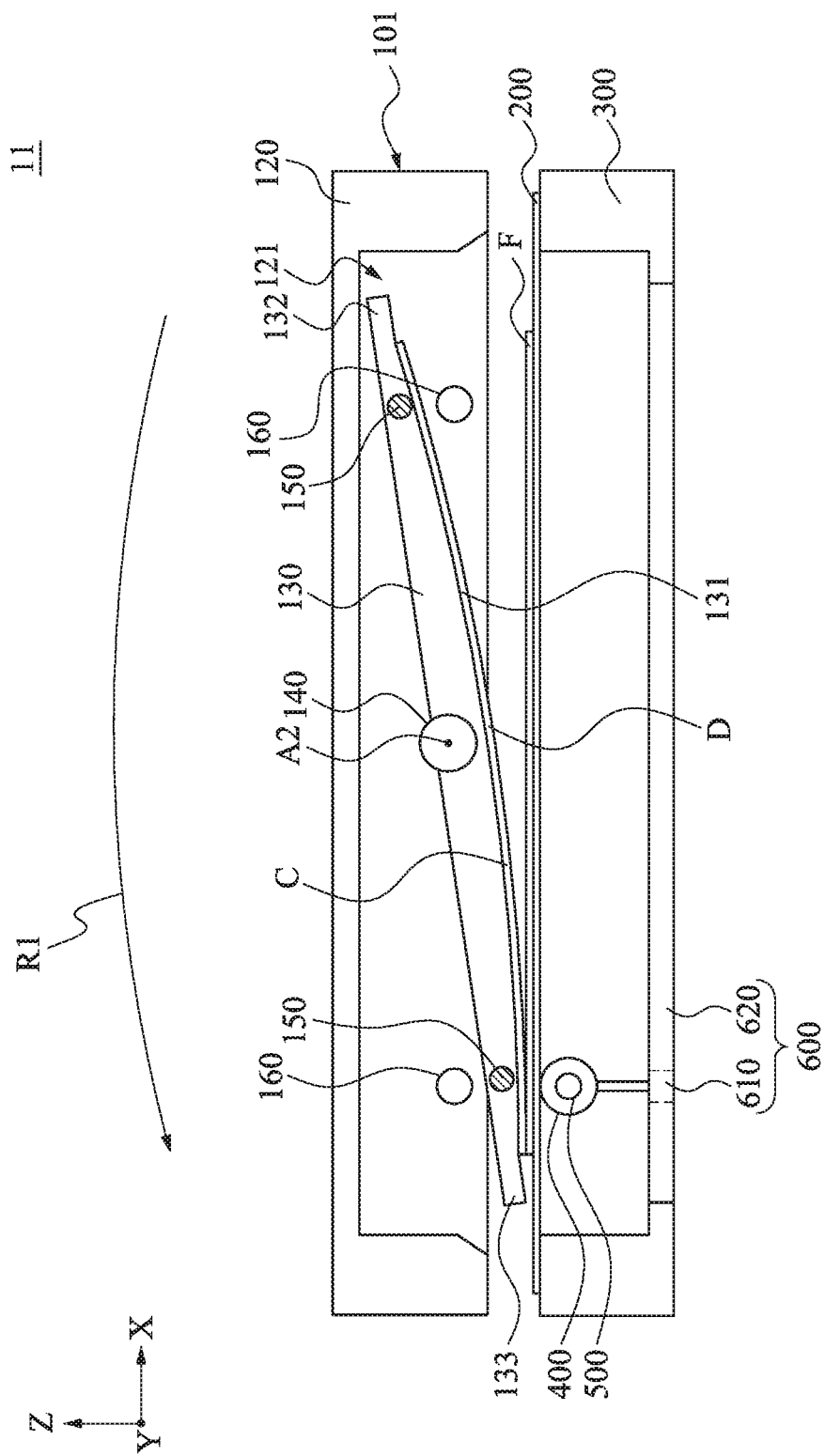
FIG. 8A to FIG. 8C are continuous operation schematic views of a substrate-bonding device according to another embodiment of the disclosure.
Figure 8B:
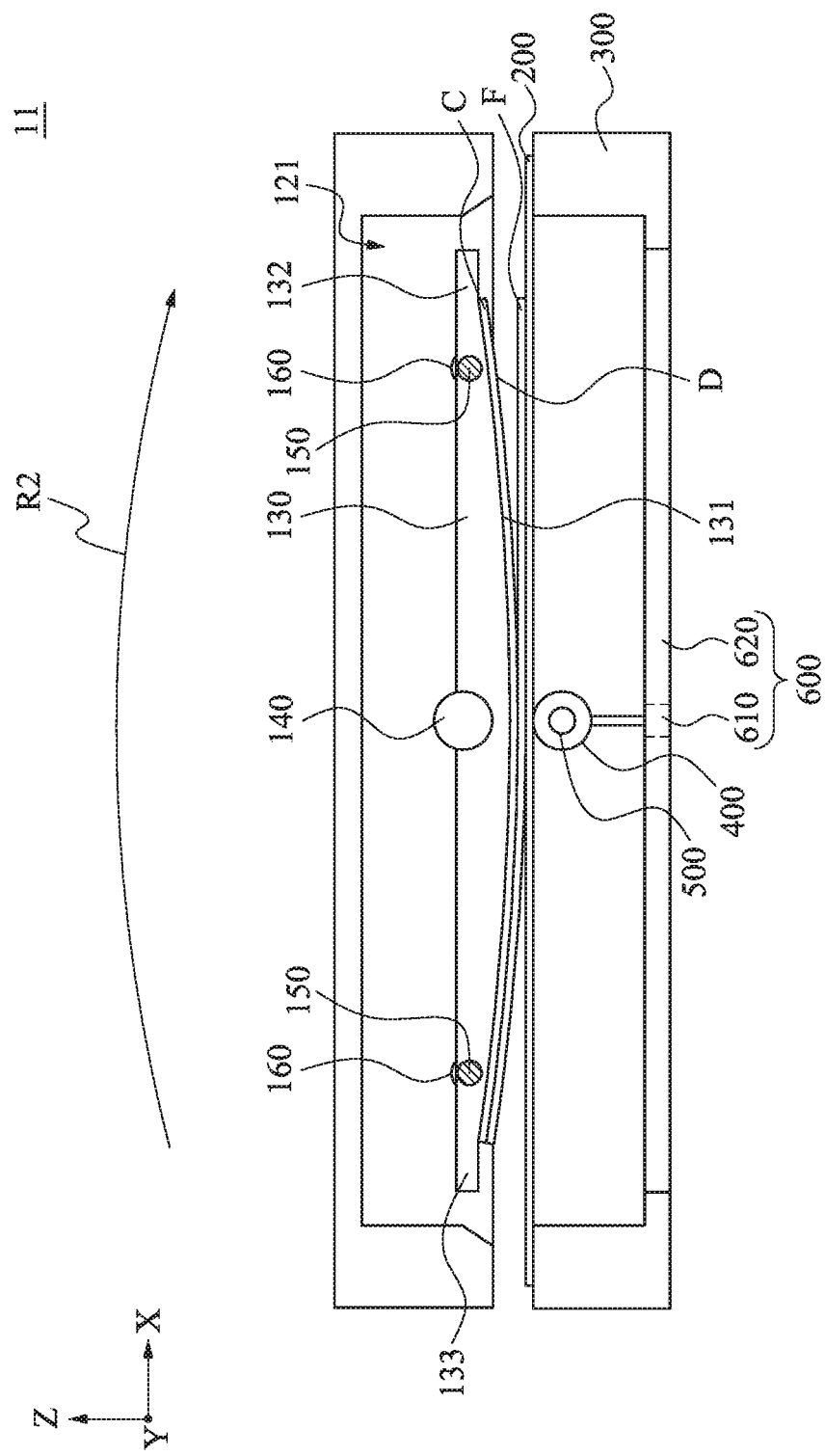
Figure 8C:
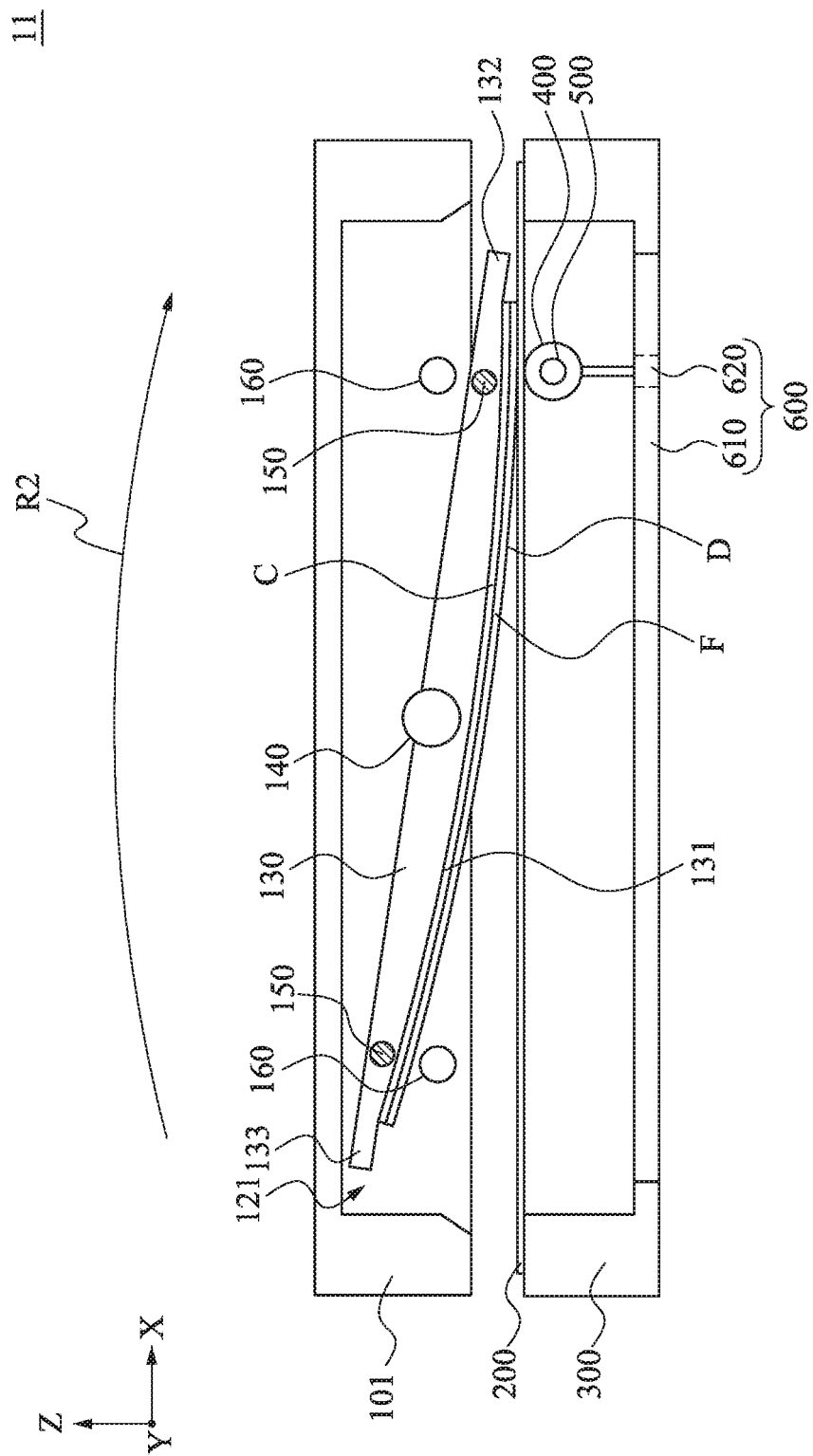

FIG. 8A to FIG. 8C are continuous operation schematic views of a substrate-bonding device 11 according to another embodiment of the disclosure. The substrate-bonding device 11 of the another embodiment is substantially the same to the substrate-bonding device 10 of the embodiments above, except that the curved glass substrate C shown in FIG. 8A is repeatedly rotated, other than lowered vertically, so that a curved-surface screen D of the curved glass substrate C can fit and bond onto the flexible light-transmissive film F from one side of the flexible light-transmissive film F to the other side of the flexible light-transmissive film F in order. For example the upper loading plate 101 includes a carrier board 120, a curved surface platform 130 and a rotating motor 140. The carrier board 120 is formed with a depression 121 thereon. An opening of the depression 121 faces towards the lower loading plate 300.

The curved surface platform 130 is rotatably disposed in the depression 121 in which the curved surface is a convex curved surface 131 of the curved surface platform 130 facing towards the lower loading plate 300, and a curvature of the convex curved surface 131 is same as the curvature of the curved glass substrate C. The rotating motor 140 is electrically connected to the controller unit 700, and rotatably connected to the curved surface platform 130, and is arranged between two opposite sides of the curved surface platform 130, so that the rotating motor 140 rotates the curved surface platform 130 about an axial center A2 of the rotating motor 140.

When the controller unit 700 controls the rotating motor 140 and the transmission device 600, for instance, to adjust the rotation speed of the rotating motor 140 and the moving speed of the transmission device 600 horizontally moving the roller 400 to be consistent, so that the curved glass substrate C and the flexible light-transmissive film F are mutually sandwiched between the convex curved surface 131 of the curved surface platform 130 and the roller 400.

In more detail, as shown in FIG. 8A, when the roller 400 starts to roll and press the flexible mesh layer 200 on the left side of the flexible mesh layer 200, the rotating motor 140 rotates the curved surface platform 130 in the direction R1 so that the left side 133 of the convex curved surface 131 of the curved surface platform 130 is rotated to abut the flexible light-transmissive film F.

As shown in FIG. 8B, when the roller 400 rolls and presses the middle area of the flexible mesh layer 200, the rotating motor 140 reversely rotates the curved surface platform 130 in the direction R2 so that the middle area of the convex curved surface 131 of the curved surface platform 130 abuts the flexible light-transmissive film F.

As shown in FIG. 8C, when the roller 400 rolls and presses the flexible mesh layer 200 on the right side of the flexible mesh layer 200, the rotating motor 140 continues to rotate the curved surface platform 130 in the direction R2 so that the right side 132 of the convex curved surface 131 of the curved surface platform 130 is rotated to abut the flexible light-transmissive film F.

In this embodiment, the upper loading plate can be overturned to position right above the lower loading plate for entering the bonding process. However, the disclosure is not limited thereto, in other embodiments, the upper loading plate also can be straightly moved to position right above the lower loading plate for entering the bonding process.

Furthermore, refer to FIG. 8A, the curved surface platform 130 is further provided with two fixing pins 150. The carrier board 120 is further formed with two receiving holes 160. The receiving holes 160 are respectively formed in the depression 121. Each of the fixing pins 150 is able to telescopically extend into one of the receiving holes 160 for fixing the curved surface platform.

While the upper loading plate is overturned to position right above the lower loading plate before the bonding process shown in FIG. 8A to FIG. 8C, in order to prevent the curved surface platform 130 from unexpectedly swaying, after the fixing pins 150 are respectively operated to insert into the receiving holes 160, the curved surface platform 130 is then fixed in the depression 121, rather than arbitrarily rotatable. On the contrary, after the fixing pins 150 are respectively operated to be withdrawn from the receiving holes 160 for starting the bonding process shown in FIG. 8A to FIG. 8C, the curved surface platform 130 is free to be rotatable.

It is noted, during the curved glass substrate and the flexible light-transmissive film are bonded together or after the curved glass substrate and the flexible light-transmissive film are bonded together, since a protective film is torn from one surface of the flexible light-transmissive film to expose an adhesive layer (not shown, e.g., optical clear adhesive) of the flexible light-transmissive film, the flexible light-transmissive film is able to be instantly bonded on the curved glass substrate C through the adhesive layer. The flexible light-transmissive film, for example, can be a touch panel, an optical sheet or a transparent protective film; however, the present disclosure is not limited to only the above-mentioned types. The curved glass substrate C for example, can be a curved display panel or an arc solar panel; however, the present disclosure is not limited to only the above-mentioned types. The shape of the curved glass substrate C is not limited to a fully curved glass substrate or a partial curved glass substrate (i.e., the middle part of the substrate is planar, and two opposite ends of the substrate are curved); however, the present disclosure is not limited to only the above-mentioned shapes.

For convenience of illustration the disclosure, the curved display panel described in the specification is merely one of examples, however, the bonding process of the disclosure is not limited to the curved display panel only. In addition, the substrate-bonding device can be selected to practice in an enclosed chamber with vacuum environment therein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A substrate-bonding device, comprising:
   an upper loading plate having a curved surface for holding a curved glass substrate thereon;
   a flexible mesh layer for holding a flexible light-transmissive film thereon;
   a lower loading plate arranged under the upper loading plate, for loading the flexible mesh layer thereon and fixing the flexible light-transmissive film through the flexible mesh layer;
   a roller movably arranged at one surface of the flexible mesh layer being opposite to the upper loading plate, for moving to press the surface of the flexible mesh layer opposite to the upper loading plate so that the flexible light-transmissive film matches a curvature of the curved glass substrate to gradually fit and bond onto the curved glass substrate;
   a sensing unit for sensing the attaching level of at least one local area of the flexible light-transmissive film bonded on the curved glass substrate, the sensing unit being disposed on the roller for synchronously moving along with the roller;
   a transmission device connected to the roller for rising and lowering the roller; and
   a controller unit electrically connected to the transmission device and the sensing unit for controlling the transmission device to adjust the rising and lowering in vertical movement of the roller for correspondingly adjusting a press force exerted by the roller to the local area of the flexible light-transmissive film in accordance with the attaching level thereof during the flexible light-transmissive film is bonded onto the curved glass substrate.

2. A substrate-bonding device, comprising:
   an upper loading plate having a curved surface for holding a curved glass substrate thereon;
   a flexible mesh layer for holding a flexible light-transmissive film thereon;
   a lower loading plate arranged under the upper loading plate, for loading the flexible mesh layer thereon and fixing the flexible light-transmissive film through the flexible mesh layer;
   a roller movably arranged at one surface of the flexible mesh layer being opposite to the upper loading plate, for moving to press the surface of the flexible mesh layer opposite to the upper loading plate so that the flexible light-transmissive film matches a curvature of the curved glass substrate to gradually fit and bond onto the curved glass substrate;
   a sensing unit for sensing the attaching level of at least one local area of the flexible light-transmissive film bonded on the curved glass substrate;
   a transmission device connected to the roller for rising and lowering the roller;
   a controller unit electrically connected to the transmission device and the sensing unit for controlling the transmission device to adjust the rising and lowering in vertical movement of the roller for correspondingly adjusting a press force exerted by the roller to the local area of the flexible light-transmissive film in accordance with the attaching level thereof during the flexible light-transmissive film is bonded onto the curved glass substrate;
   a first vacuum suction module connected to the upper loading plate, wherein the curved surface is formed with a plurality of first holes, and the first vacuum suction module is used for tightly sucking the curved glass substrate on the curved surface through the first holes; and
   a second vacuum suction module connected to the lower loading plate, wherein the lower loading plate is formed with a plurality of second holes, the flexible mesh layer is formed with a plurality of mesh holes, and the second vacuum suction module is used for tightly sucking the flexible light-transmissive film on the flexible mesh layer through the mesh holes and the second holes.

3. The substrate-bonding device of claim 1, wherein the upper loading plate is formed with a recess, wherein the curved surface is a concave curved surface formed in the recess and facing towards the lower loading plate, and a curvature of the concave curved surface is same as the curvature of the curved glass substrate.

4. A substrate-bonding device, comprising:
   an upper loading plate having a curved surface for holding a curved glass substrate thereon, the upper loading plate comprising:
     a carrier board formed with a depression thereon, wherein an opening of the depression faces towards a lower loading plate;
     a curved surface platform rotatably disposed in the depression, wherein the curved surface is a convex curved surface of the curved surface platform facing towards the lower loading plate, and a curvature of the convex curved surface is same as the curvature of the curved glass substrate; and
     a rotating motor electrically connected to a controller unit, and rotatably connected to the curved surface platform, and arranged between two opposite sides of the curved surface platform, used for rotating the curved surface platform;
   a flexible mesh layer for holding a flexible light-transmissive film thereon;

the lower loading plate arranged under the upper loading plate, for loading the flexible mesh layer thereon and fixing the flexible light-transmissive film through the flexible mesh layer;

a roller movably arranged at one surface of the flexible mesh layer being opposite to the upper loading plate, for moving to press the surface of the flexible mesh layer opposite to the upper loading plate so that the flexible light-transmissive film matches a curvature of the curved glass substrate to gradually fit and bond onto the curved glass substrate;

a sensing unit for sensing the attaching level of at least one local area of the flexible light-transmissive film bonded on the curved glass substrate;

a transmission device connected to the roller for rising and lowering the roller; and a controller unit electrically connected to the transmission device and the sensing unit for controlling the transmission device to adjust the rising and lowering in vertical movement of the roller for correspondingly adjusting a press force exerted by the roller to the local area of the flexible light-transmissive film in accordance with the attaching level thereof during the flexible light-transmissive film is bonded onto the curved glass substrate, the controller unit controlling the rotating motor and the transmission device, so that the curved glass substrate and the flexible light-transmissive film are mutually sandwiched between the convex curved surface of the curved surface platform and the roller.

5. The substrate-bonding device of claim 4, wherein the curved surface platform is further provided with at least one fixing pin, and the carrier board is further formed with at least one receiving hole, wherein the fixing pin is telescopically extends into the receiving hole for fixing the curved surface platform.

\* \* \* \* \*